US007711066B2

(12) United States Patent
Jiang et al.

(10) Patent No.: US 7,711,066 B2

(45) Date of Patent: May 4, 2010

(54) UNIFORM CHANNEL DECOMPOSITION FOR MIMO COMMUNICATIONS

(75) Inventors: Yi Jiang, San Diego, CA (US); Jian Li, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 11/718,506

(22) PCT Filed: Nov. 4, 2005

(86) PCT No.: PCT/US2005/040294

§ 371 (c)(1), (2), (4) Date: Jan. 3, 2008

(87) PCT Pub. No.: WO2006/052890

PCT Pub. Date: May 18, 2006

(65) Prior Publication Data

US 2008/0112504 A1 May 15, 2008

Related U.S. Application Data

(60) Provisional application No. 60/625,525, filed on Nov. 5, 2004.

(51) Int. Cl.
*H04L 25/49* (2006.01)

(52) U.S. Cl. ....................................... 375/296; 375/285

(58) Field of Classification Search ................. 375/260, 375/296, 233

See application file for complete search history.

(56) References Cited

U.S. PATENT DOCUMENTS

| | | | | |
|---|---|---|---|---|
| 6,937,843 | B2 * | 8/2005 | Foschini et al. | 455/1 |
| 7,209,522 | B1 * | 4/2007 | Shirali | 375/285 |
| 2003/0048856 | A1 * | 3/2003 | Ketchum et al. | 375/260 |

OTHER PUBLICATIONS

Ginis et al, "A multi-user PRecoding Scheme achieving Crosstalk Cancellation with Application to DSL Systems," Signals, Systems and Computers, 2000. Conference Record of the Thirty-Fourth Asilomar Conference on Oct. 29-Nov. 1, 2000, Piscataway, NJ, USA, IEEE, vol. 2, Oct. 29, 2000, pp. 1627-1631, XP010535274 ISBN: 0-7803-6514-3.*

Sampath et al., Generalized Linear Precoder and Decoder Design for MIMO Channels Using the Weighted MMSE Criterion, Dec. 2001, IEEE Transactions on Communications, vol. 49, pp. 2198-2206.*

(Continued)

*Primary Examiner*—Shuwang Liu
*Assistant Examiner*—David Huang
(74) *Attorney, Agent, or Firm*—Thomas, Kayden, Horstemeyer & Risley, LLP

(57) ABSTRACT

A multi-input-multi-output (MIMO) communications system is provided for conveying signals over a MIMO channel. The system includes a precoder for precoding a signal based upon a uniform channel decomposition scheme. The system further comprises a transmitter in communication with the precoder for conveying the precoded signal over a subchannel of the MIMO channel.

19 Claims, 6 Drawing Sheets

OTHER PUBLICATIONS

Jiang et al., MIMO Transceiver Design Using Geometric Mean Deomposition, IEEE Information Theory Workshop, San Antonio, TX, pp. 193-197, Oct. 24-29, 2004.

Jiang et al., Joint Transceiver Design for MIMO Communications Using Geometric Mean Decomposition, submitted to IEEE Transactions on Signal Processing, Mar. 2004, http://www.sal.ufl.edu/yjiang/papers/gmdCommR2.pdf, retrieved Feb. 22, 2006.

Love et al., Limited Feedback Precoding for Spatial Multiplexing Systems, IEEE Global Communications Conference, San Francisco, CA, vol. 7, pp. 1857-1861, Dec. 1-5, 2003.

* cited by examiner

Column $k$
↓

```
X  X  X  0  0  0         X  X  X  X  0  0
   X  X  0  0  0            X  X  X  0  0
→     X  0  0  0               X  X  0  0
Row k  X  0  0                    X  0  0
          X  0                       X  0
             X                          X
```

$R^{(k)}$ ⟶ $G_2^* \Pi R^{(k)} \Pi G_1$

UNIFORM CHANNEL DECOMPOSITION FOR MIMO COMMUNICATIONS

FIELD OF THE INVENTION

The invention is generally related to the field of communications, and, more particularly, to communications over multiple-input-multiple-output channels.

BACKGROUND OF THE INVENTION

Communications over multiple-input-multiple-output (MIMO) channels has been the subject of intense research in recent years and has emerged as one of the most significant breakthroughs in modern communications. Communications over MIMO channels can support significantly higher data rates and greater reliability relative to communications using single-input-single-output (SISO) channels. MIMO-based communications may help, for example; to resolve the bottleneck problem limiting traffic capacity in future Internet-intensive wireless networks. Many researchers also believe that MIMO-based technology is poised to penetrate large-scale, standards-driven commercial wireless products and networks such as broadband wireless access systems, wireless local area networks (WLAN), and third-generation (3G) as well as fourth-generation (4G) networks.

An essential feature of a MIMO communications system is that, by appropriately coding signals transmitted from multiple transmitting antennas to multiple receiving antennas, the system is able to turn multipath-propagation—long a problem in wireless communications—into an advantage. MIMO communications systems take advantage of random channel fading and, when possible, multipath delay spread to increase channel capacity. This is accomplished by combining at a receiver the signals transmitted from multiple transmitting antennas to multiple receiving antennas so as to increase quality in terms of the bit-error rate (BER) or the data rate (bits per second). The prospect of improvements of orders of magnitude relative to more conventional communications systems is one reason for the increased interest in MIMO-based technologies.

With respect to transceivers, most research to date has focused on linear transceiver designs. According to conventional linear transceiver designs, a channel matrix that models the characteristics of a transmission channel is diagonalized using the known technique of singular value decomposition (SVD) in order to maximize channel throughput. This conventional approach, however, can add considerable complexity to the modulation-demodulation and coding-decoding procedures needed to successfully convey signals over multiple subchannels resulting from the SVD. For example, to achieve a desired channel capacity, the MIMO system must perform bit allocation to match each subchannel capacity.

Bit allocation not only complicates the needed modulation but also reduces capacity due to the granularity of a finite symbol constellation corresponding to the coding scheme employed. Alternatively, if the same symbol constellation is used for each subchannel, as for example according to the HIPERLAN/2 and IEEE 802.11 standards for WLANs, then more power should be allocated to the poorer or less robust subchannels. Using the same constellation for each subchannel can lead to significant performance degradation. The conventional linear transceiver designs, therefore, pose a tradeoff between channel capacity and performance in terms of BER if the complexity of bit allocation is to be avoided. It follows that there is a need for an effective and efficient alternative to conventional linear transceiver designs.

SUMMARY OF THE INVENTION

The present invention provides systems and method for implementing a uniform channel decomposition scheme. The uniform decomposition scheme decomposes a MIMO channel into a plurality of subchannels over which communication signals are conveyed.

One embodiment of the invention is a multi-input-multi-output (MIMO) communications system for conveying signals over a MIMO channel. The system can include a precoder for precoding a signal based upon a uniform channel decomposition scheme. The system can further include a transmitter in communication with the precoder for conveying the precoded signal over a subchannel of the MIMO channel.

A system for conveying signals over a MIMO channel, according to another embodiment of the invention, can include a transmitting unit having an array of transmitting antennas and a uniform channel decomposition module for decomposing a transmission channel into multiple subchannels having equal capacities over which multiple communications signal are conveyed. The system also can include a receiving unit having an array of receiving antennas for receiving the multiple communications signals.

Another embodiment of the invention is a method for conveying signals over a MIMO channel. The method can include precoding a signal based upon a uniform channel decomposition scheme. The method further can include transmitting the precoded signal over a subchannel of the MIMO channel.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF PREFERRED EMBODIMENTS

The invention provides a uniform channel decomposition scheme for multiple-input-multiple-output (MIMO) communications systems. The uniform channel decomposition scheme decomposes a MIMO channel into multiple subchannels such that each subchannel has the same, or approximately the same, capacity in the sense that the output of each subchannel has the same signal-to-noise plus interference ratio (SNIR). As explained herein, this affords an opportunity to simplify modulation and demodulation as well as coding and decoding of transmitted signals. The channel decomposition effected by the uniform channel decomposition scheme also can decompose a MIMO channel into multiple subchannels that are strictly capacity lossless. The uniform channel decomposition scheme also can enable the MIMO communications system to achieve maximal diversity gain. UCD can achieve an optimal tradeoff between diversity gain and multiplexing gain with relatively low processing complexity.

As described herein, the uniform channel decomposition scheme can be implemented in different forms. The invention also can be applied to a variety of communication protocols, including those based on orthogonal frequency division multiplexing (OFDM), code division multiple access (CDMA), time division multiple access (TDMA), and the global system for mobile communications (GSM).

Although described herein primarily in the context of wireless communications systems, it will be readily apparent to one of ordinary skill in the art, that the invention can be applied to other communications systems and devices as well. The systems include voice and data systems such as those utilizing digital telecommunications protocols and those utilizing digital subscriber lines (DSL). The devices with which the invention can be implemented include, for example, cellular phones, personal digital assistants (PDA), and computing devices such as laptop computers.

Figure 1:
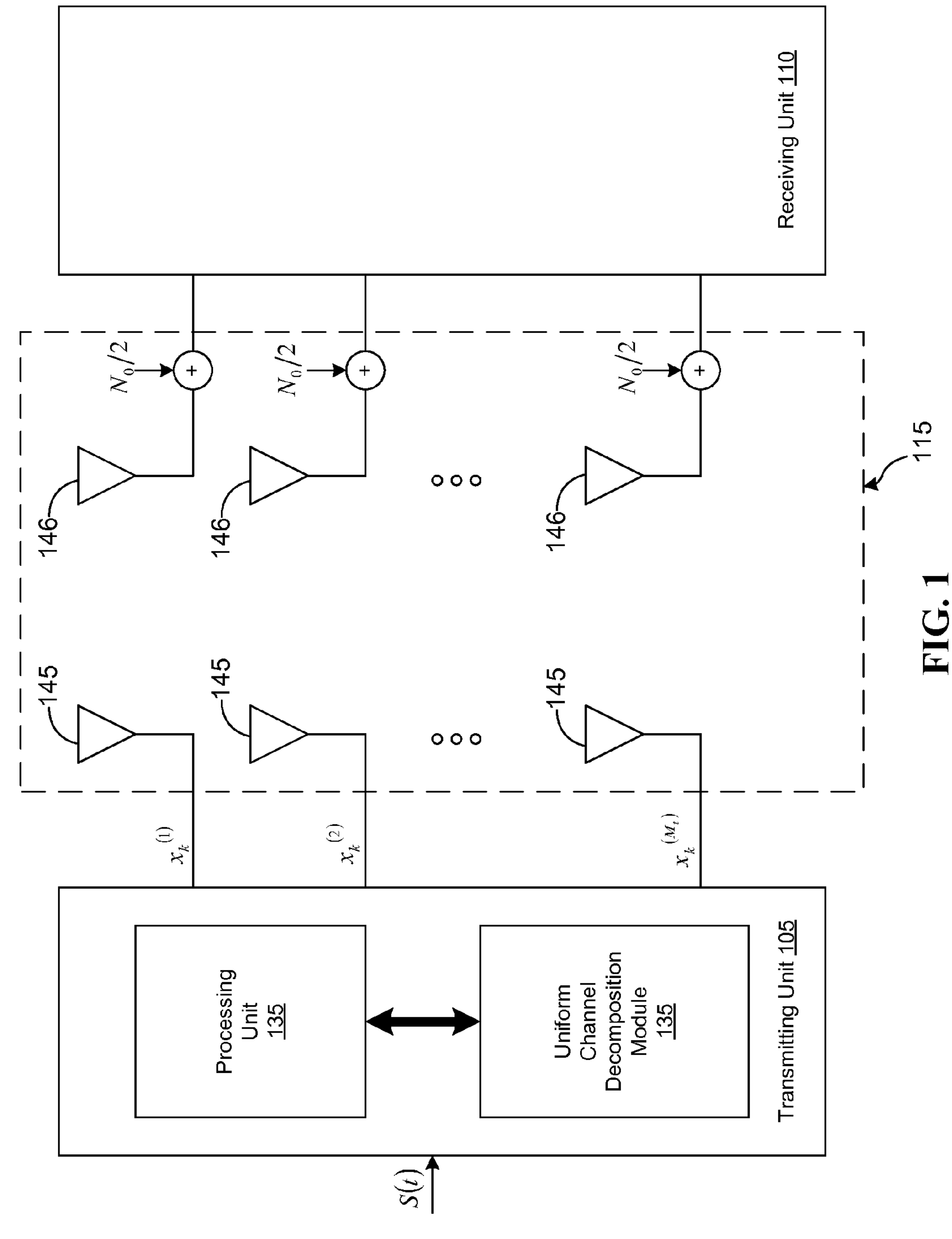
FIG. 1 is a schematic diagram of a multiple-input-multiple-output communications system that implements a uniform channel decomposition, according to one embodiment of the invention.

FIG. 1 schematically illustrates a UCD-based MIMO communications system 100 according to one embodiment of the invention. The communications system 100 illustratively comprises a transmitting unit 105 and a receiving unit 110, the transmitting unit conveying information-carrying signals to the receiving unit over a transmission medium, or MIMO channel 115. The transmitting unit 105 illustratively connects to a plurality of transmitting antennas 145 that simultaneously transmit differently encoded signals, or symbols. The receiving unit 110 illustratively connects to a plurality of receiving antennas 146 that simultaneously receive the different signals, or symbols, conveyed via the channel 115.

The transmitting unit 105 illustratively comprises a processing unit 135 implemented in dedicated hardwired circuitry and/or machine-readable code configured to be processed by logic-based circuitry. The processing unit 135 samples input signal S(t) and maps sampled bit sequences into a vector comprising corresponding symbols $x_k$. Illustratively, the plurality of transmitting antennas 145 comprises $M_t$ antennas, and the processing unit 135 generates $M_t$ symbols, where the i-th symbol, $x_k^{(i)}$, is conveyed as a signal transmitted by the i-th transmitting antenna.

According to one embodiment, each $x_k^{(i)}$, $1 \leqq i \leqq M_t$, symbol is a complex quadrature amplitude modulation (QAM) symbol. The symbols, however, can be coded according to any other scheme, including quadrature phase shift keying (QPSK), M-ary phase shift keying (MPSK), cross-QAM, and offset-QPSK, for example.

The transmitting unit 105 further includes a uniform channel decomposition (UCD) module 140 that effects the UCD scheme described more particularly below. According to one embodiment, the UCD module 140 comprises a precoder, implemented in hardwired circuitry and/or machine-readable code, which precodes the symbols $x_k$ in accordance with the UCD scheme prior to their conveyance via the Channel 115 to the receiving unit 110. In effecting the UCD scheme, the UCD module 140 effectively decomposes the channel 115 into multiple subchannels, each having the same, or substantially the same, capacity as each of the other subchannels. Equivalently, each of the multiple subchannels decomposed according to the UCD scheme has an identical, or nearly identical, SNIR.

The UCD scheme is now described in the context of the channel 115, which is characterized herein as a frequency-selective channel. The channel can be represented by an $M_t \times M_r$ complex matrix, $H \in \mathbb{C}^{M_t \times M_r}$, of rank K. Each element of the complex matrix, H, denotes a fading channel coefficient. For example, a 2×2 MIMO channel characterized by inter-symbol interference (ISI) and spatial correlation can be modeled with the following matrix:

$$H(t) = R_r^{1/2}\begin{bmatrix} h_{11}(t) & h_{12}(t) \\ h_{21}(t) & h_{22}(t) \end{bmatrix} R_t^{1/2},\ 0 \le t \le (L-1)T, \tag{1}$$

where $R_t$ and $R_r$ quantify the spatial correlations of the channel fading. The elements of the matrix, more particularly, are:

$$h_{ij}(t) = \sum_{l=1}^{L-1} h_{ij}^{(l)}\delta(t - lT),\ 1 \le i,\ j \le 2, \tag{2}$$

where $h_{ij}$ denotes the channel link between the j-th transmitter antenna and the i-th receiver antenna, L denotes the channel link and T represents the sampling period.

A more general frequency-selective channel can be represented by a spatial-time channel with larger dimensionality. Using $M_t$ transmitting antennas and $M_r$ receiving antennas for conveying signals over a frequency flat fading channel, the sampled baseband signal can be represented as $$y = HFx + z, \tag{3}$$

The x is an L×1 vector of complex elements, $x \in \mathbb{C}^{L \times 1}$, representing the information symbols precoded by a linear precoder $F \in \mathbb{C}^{M_t \times L}$. The vector y is an $M_r \times 1$ vector of complex elements, $y \in \mathbb{C}^{M_r \times 1}$, representing the received signal. The matrix $H \in \mathbb{C}^{M_t \times M_r}$ is the rank K channel matrix, the (i,j)-th elements of which denote the fading coefficient between the j-th transmitting antenna and the i-th receiving antenna. The vector z represents inherent noise in the channel. It can be assumed that $E[xx^*] = \sigma_x^2 I_L$, where E(•) denotes the expected value, (•)* denotes the conjugate transpose, and $I_L$ is an identity matrix of dimension L. It can be further assumed that the noise is circularly symmetric complex Gaussian noise; that is, $z \sim N(0, \sigma_z^2 I_L)$. The signal to noise ratio therefore can be defined as $$\rho = \frac{E[x * F * Fx]}{\sigma_z^2} = \frac{\sigma_x^2}{\sigma_z^2} Tr\{F * F\} \triangleq \frac{1}{\alpha} Tr\{F * F\}, \tag{4}$$

where Tr{•} denotes the trace of a matrix. It should be noted that because a more general frequency-selective channel can be represented by a spatial-time channel with larger dimensionality, Equation 3, accordingly, provides a general representation of the channel 115.

If the vector of information symbols, x, is a Gaussian random vector, then the capacity of the channel 115 is $$C = \log_2 \frac{|\sigma_z^2 I + \sigma_x^2 HFF * H *|}{|\sigma_z^2 I|}, \tag{5}$$

where |•| denotes the determinant of a matrix. If the channel state information at the transmitter (CSIT) and the channel state information at the receiver (CSIR) are both available, the channel capacity can be maximized with respect to a linear precoder F given the input power constraint $\sigma_x^2\mathrm{Tr}\{FF^*\}\leqq P$; that is, $$C_{IT}=\max_{\sigma_x^2 Tr\{FF^*\}\leq P}\log_2|I+\alpha^{-1}HFF*H*|, \quad (6)$$

where, from equation 4, $$\alpha=\frac{\sigma_z^2}{\sigma_x^2},$$

and $C_{IT}$ is the charnel capacity of an "informed transmitter."

A singular-value decomposition (SVD) of the channel matrix, H, yields $H=U\Lambda V^*$, where U and V* are unitary matrices and Λ is a K×K matrix whose diagonal elements $\{\lambda_{H,k}\}_{k=1}^K$ are the nonzero singular values of H. A conventional form of a MIMO channel linear precoder, F, is $F=V\Phi^{1/2}$, where V is the conjugate transpose of V* determined from the SVD of the channel matrix, H. With L=K, Φ is a diagonal matrix whose k-th diagonal element, $\phi_k(\mu)$, $1\leqq k\leqq K$, is the power loaded to the k-th subchannel. Each of the diagonal elements, $\phi_k(\mu)$, can be determined from the following equation based on the known "water filling" technique:

$$\phi_k(\mu)=\left(\mu-\frac{\alpha}{\lambda_{H,k}^2}\right)^+, \quad (7)$$

with μ being chosen such that $$\sigma_x^2\sum_{k=1}^K\phi_k(\mu)=P.$$

The solution to equation 6, therefore, is $$C_{IT}=\sum_{k=1}^K\log_2\left(1+\frac{\phi_k}{\alpha}\lambda_{H,k}^2\right)\text{bit/s/Hz}. \quad (8)$$

The conventional linear precoder, F, can be used to obtain a conventional linear transceiver design that is, in an information-theoretic sense, optimal. However, owing to the usually very different diagonal elements $\{\lambda_{H,k}\}_{k=1}^K$ obtained by performing an SVD of the channel matrix, H, the resulting conventional linear transceiver is typically characterized by multiple subchannels that each have very different SNRs. This gives rise to particular difficulties with respect to the subsequent modulation/demodulation and coding/decoding procedures that must be utilized with conventional linear transceivers.

One aspect of the UCD scheme of the present invention is the implementation of a precoding technique that yields a modified precoder, $\tilde{F}$, superior to conventional precoders, F. When coupled with an appropriate sequential nulling and cancellation procedure, the precoding procedure can, in a strictly lossless sense, decompose a MIMO channel into multiple subchannels whose capacities in terms of a SNIR, as noted above, are identical or nearly so. The UCD scheme can ease the computational burden of modulation/demodulation and coding/decoding by obviating the need for bit allocations. Moreover, for signals with sufficiently high SNRs, channel throughput and bit-error rates (BERs) can be simultaneously optimized using the UCD scheme.

The UCD scheme and the various embodiments by which a UCD is accomplished can be rigorously described in a mathematical context using the following theorem:

Theorem

Any rank K matrix $H\in\mathbb{C}^{M\times N}$ having singular values $\lambda_{H,1}\geqq\lambda_{H,2}\geqq\ldots\geqq 0$ can be decomposed into $$H=QRP^*, \quad (9)$$

where $R\in\mathbb{R}^{K\times K}$ is an upper triangular matrix, the equal diagonal elements of which are defined as $$r_{ii}=\bar{\lambda}_H\triangleq\left(\prod_{n=1}^K\lambda_{H,n}\right),\ 1\leq i\leq K,$$

and where $Q\in\mathbb{C}^{M\times K}$ and $P\in\mathbb{C}^{N\times K}$ are each semi-unitary matrices whose columns are orthonormal with one another. A computationally efficient and numerically stable algorithm for effecting the decomposition reflected in equation 9 is provided below.

According to one embodiment, the UCD is accomplished using a precoder matrix that is a modification of a conventional precoder matrix. This modified precoder matrix, $\tilde{F}$, has the following form $$\tilde{F}=V\Phi^{1/2}\Omega^*. \quad (10)$$

The first term on the left-hand side of equation (1), V, is a unitary matrix indirectly derived by performing an SVD of the channel matrix, H, which as already described yields the following:

$$H=U\Lambda V^*,$$

where the middle term, Λ, is a K×K matrix whose diagonal elements $\{\lambda_{H,k}\}_{k=1}^K$ are the nonzero singular values of H. The first term on the left-hand side of equation 10, V, accordingly is the conjugate transpose of V*.

The middle term on the left-hand side of equation 10, $\Phi^{1/2}$, is based on the diagonal matrix Φdiagonal elements, $\phi_k$, k=1, 2, . . . , K, of which are determined based on the known "water filling" technique also described above:

$$\phi_k(\mu)=\left(\mu-\frac{\alpha}{\lambda_{H,k}^2}\right)^+.$$

The last term on the left-hand side of equation 10, Ω, is a real-valued L×K matrix, such that $L\geqq K$ and $\Omega^*\Omega=I$. The introduction of the L×K matrix, Ω, is one step leading to the UCD. As will be apparent from the following discussion, introduction of Ω provides several distinct advantages. Firstly, however, the design of Ω is described.

Precoding transmitted signals using the precoder matrix, $\tilde{F}$, gives rise to the following virtual channel, which mathematically represents the channel over which the signals are conveyed:

$$G\triangleq H\tilde{F}=U\Lambda\Phi^{1/2}\Omega^*\triangleq U\Sigma\Omega^* \quad (11)$$

where $\Sigma=\Lambda\phi^{1/2}$ is a diagonal matrix, the diagonal elements of which are $\{\sigma_{i\}i=1}^K$.

The following augmented matrix can be obtained from the representation of the virtual channel, where α is the ratio of the variance in noise in the channel, $\sigma_z^2$, to the variance within the transmitted signals, $\sigma_x^2$; that is, $$\alpha = \frac{\sigma_z^2}{\sigma_x^2}:$$

$$G_a = \begin{bmatrix} U\Sigma\Omega^* \\ \sqrt{\alpha}\, I_L \end{bmatrix}. \tag{12}$$

A semi-unitary matrix $\Omega \in \mathbb{C}^{L\times K}$ is found such that a standard QR decomposition of $G_a$ yields an upper triangular matrix having equal diagonal elements. This is more particularly demonstrated by rewriting the augmented matrix, $G_a$, as follows:

$$G_a = \begin{bmatrix} U[\Sigma \vdots 0_{K\times(L-K)}]\Omega_0^* \\ \sqrt{\alpha}\, I_L \end{bmatrix}, \tag{13}$$

where $\Omega_0 \in \mathbb{C}^{L\times L}$ is a unitary matrix. The matrix Ω is formed from the first K columns of the matrix $\Omega_0$. The augmented matrix $G_a$ can be further rewritten as $$G_a = \begin{bmatrix} I_{M_T} & 0 \\ 0 & \Omega_0 \end{bmatrix} \begin{bmatrix} U[\Sigma \vdots 0_{K\times(L-K)}] \\ \sqrt{\alpha}\, I_L \end{bmatrix} \Omega_0^*. \tag{14}$$

The middle term of the right-hand side of the equation can be decomposed according to a geometric mean decomposition GMD, which follows from the theorem, above. The decomposition yields the following matrix:

$$J \triangleq \begin{bmatrix} U[\Sigma \vdots 0_{K\times(L-K)}] \\ \sqrt{\alpha}\, I_L \end{bmatrix} = Q_J R_J P_J^*, \tag{15}$$

where $R_J \in \mathbb{R}^{L\times L}$ is an upper triangular matrix with equal diagonal elements, $Q_J \in \mathbb{C}^{(M_r\times L)\times L}$ is a semi-unitary matrix, and $P_J \in \mathbb{C}^{L\times L}$ is a unitary matrix. By substitution of equation 15 into equation 14, the following form of the augmented matrix is obtained:

$$G_a = \begin{bmatrix} I_{M_r} & 0 \\ 0 & \Omega_0 \end{bmatrix} Q_J R_J P_J^* \Omega_0^*. \tag{16}$$

Setting $\Omega_0 = P^*_J$ and $$Q_{G_a} = \begin{bmatrix} I_{M_r} & 0 \\ 0 & \Omega_0 \end{bmatrix} Q_J, \tag{17}$$

it follows that equation 16 can be rewritten as $G_a = Q_{G_a} R_J$, which is the QR decomposition of $G_a$. The semi-unitary matrix Ω associated with $G_a$ comprises the first K columns of $\Omega_0$ or, alternatively, $P^*_J$, since $\Omega_0 = P^*_J$.

Given the singular-value decomposition (SVD) of H and the "water filling" level $\Phi^{1/2}$, only the GMD of equation 15 need be calculated. The desired linear precoder, $\tilde{F} = V\Phi^{1/2}\Omega^*$, follows directly from the GMD. The term Ω comprises the first K columns of $P^*_J$. If $Q_{G_a}{}^u$ denotes the first $M_r$ rows of $Q_{G_a}$, or equivalently, the first $M_r$ rows of $Q_J$, then it can be shown that an appropriate set of nulling vectors can be calculated as $$w_i = r_{J,ii}^{-1} q_{G_a,i},\ i=1, 2, \ldots, L, \tag{18}$$

where $r_{J,ii}$ is the $i^{th}$ diagonal element of $R_J$ and $q_{G_a,i}$ is the $i^{th}$ column of $Q_{G_a}{}^u$.

The computational complexity can be reduced by making several additional observations. For any matrix $B \in \mathbb{C}^{M\times N}$ for which the SVD yields $B = U_B \Lambda_B V^*_B$ and a corresponding augmented matrix for which the SVD yields $$A = \begin{bmatrix} B \\ \sqrt{\alpha}\, I \end{bmatrix} = U_A \Lambda_A V_A^*, \tag{19}$$

it follows that the diagonal elements $\lambda_{A,i}$ and $\lambda_{B,i}$ of $\Lambda_A$ and $\Lambda_B$, respectively, satisfy $\lambda_{A,i} = \sqrt{\lambda_{B,i}{}^2 + \alpha}$, i=1, 2, . . . , N. Moreover, $$U_A = \begin{pmatrix} U_B \Lambda_B \Lambda_A^{-1} \\ \sqrt{\alpha}\, V_B^* \Lambda_A^{-1} \end{pmatrix} \text{ and } V_A = V_B. \tag{20}$$

Accordingly the SVD of J, above, is $$J \triangleq \begin{bmatrix} U\left[\sum \vdots 0_{Kx(L-K)} \tilde{\sum}^{-1}\right. \\ \sqrt{\alpha}\, \tilde{\sum}^{-1} \end{bmatrix} \tilde{\sum} I_L, \tag{21}$$

where $\tilde{\Sigma}$ is an L-by-L diagonal matrix with the following diagonal elements $$\tilde{\sigma}_i = \sqrt{\sigma_i^2 + \alpha},\ 1 \leqq i \leqq K \tag{22a}$$

and $$\tilde{\sigma}_i = \sqrt{\alpha},\ K=1 \leqq i \leqq L. \tag{22b}$$

Performing a GMD of $\tilde{\Sigma}$ yields $$\tilde{\Sigma} = (Q_1 Q_2 \ldots Q_{L-1}) R_J (P_{L-1}{}^T P_{L-2}{}^T \ldots P_1{}^T) \tag{23}$$

Hence, it follows that $$\begin{bmatrix} U[\sum \vdots 0_{Kx(L-K)} \\ \sqrt{\alpha}\, I_L \end{bmatrix} = \begin{bmatrix} U[\sum \vdots 0_{Kx(L-K)}]\tilde{\sum}^{-1} \\ \sqrt{\alpha}\, \tilde{\sum}^{-1} \end{bmatrix} (Q_1 Q_2 \ldots Q_{L-1}) R_J (P_{L-1}^T P_{L-2}^T \ldots P_1^T) \tag{24}$$

Therefore the linear precoder, $\tilde{F}$, has the following form:

$$\tilde{F} = V[\Phi^{1/2} \vdots 0_{Kx(L-K)}] P_1 P_2 \ldots P_{L-1}. \tag{25}$$

Moreover, the matrix, $Q_{G_a}{}^{u}$, above, can be written in the following form $$Q_{G_a}{}^{u}=U[\Sigma \vdots 0_{K\times(L-K)}]\tilde{\Sigma}^{-1}Q_1\,Q_2 \ldots Q_{L-1}. \tag{26}$$

It should be noted the $Q_l$ and $P_l$, l=1, 2, . . . , L, are each Givens rotation matrices, as will be readily understood by one of ordinary skill in the art. Accordingly, calculating (25) and (26) can be accomplished in $O(M_tL)$ and $O(M_rL)$ flops, respectively.

Algorithmically, the UCD scheme can be accomplished through a sequence of operations. Firstly, a singular-value decomposition of the channel matrix is obtained, yielding $H=U\Lambda V^*$. The matrix $\Phi^{1/2}$ is subsequently obtained, where $\Phi$ is the diagonal matrix whose k-th diagonal element, $\phi_k$, $(1\leqq k\leqq K)$, determines the power loaded to the k-th subchannel, as described above; that is, using the known "water filling" technique described above, each of the k-th diagonal elements is determined to be:

$$\phi_k(\mu)=\left(\mu-\frac{\alpha}{\lambda_{H,k}^2}\right)^+.$$

Using the middle term of the right-hand side of the equation resulting from the singular-value decomposition of the channel matrix and the matrix obtained through the "water filling" technique, the following matrix product is the obtained: $\Sigma=\Lambda\Phi^{1/2}$. Next, the L×L diagonal matrix $\tilde{\Sigma}$ is obtained by computing the diagonal elements to be $\tilde{\sigma}_i=\sqrt{\sigma_i^2+\alpha}$ for each $1\leqq i\leqq K$ and $\tilde{\sigma}_i=\sqrt{\alpha}$ for each $K=1\leqq i\leqq L$. Applying the geometric mean decomposition algorithm to $\tilde{\Sigma}$ then yields $\tilde{\Sigma}(Q_1\Omega_2 \ldots Q_{L-1})R_J(P_{L-1}{}^TP_{L-2}{}^T \ldots P_1{}^T)$. From these operations the linear precoder, $\tilde{F}$, is obtained as $F=V[\Phi^{1/2}\vdots 0_{K\times(L-K)}]P_1\;P_2 \ldots P_{L-1}$. The matrix $Q_{G_a}{}^{u}$, corresponding to the first $M_r$ rows of the matrix $Q_{G_a}$, defined above, is obtained as $Q_{G_a}{}^{u}=U[\Sigma\vdots 0_{K\times(L-K)}]Q_q\Omega_2 \ldots Q_{L-1}$.

Finally, the nulling vectors are determined so that nulling and cancellation can be performed on any signal precoded by the linear precoder $\tilde{F}$. An appropriate sequential nulling and cancellation procedure is described by the following pseudo code:

$v_{M_t}=y$ for $i=M_t:-1:1$ $\hat{x}_i=w_i{}^*v_i$(nulling step)

$\tilde{x}_i=C[\hat{x}_i]$ $v_{i-1}=v_i-h_i\tilde{x}_i$(cancellation step)

end, where C represents a mapping to the nearest symbol of a predefined symbol constellation.

Figure 2:
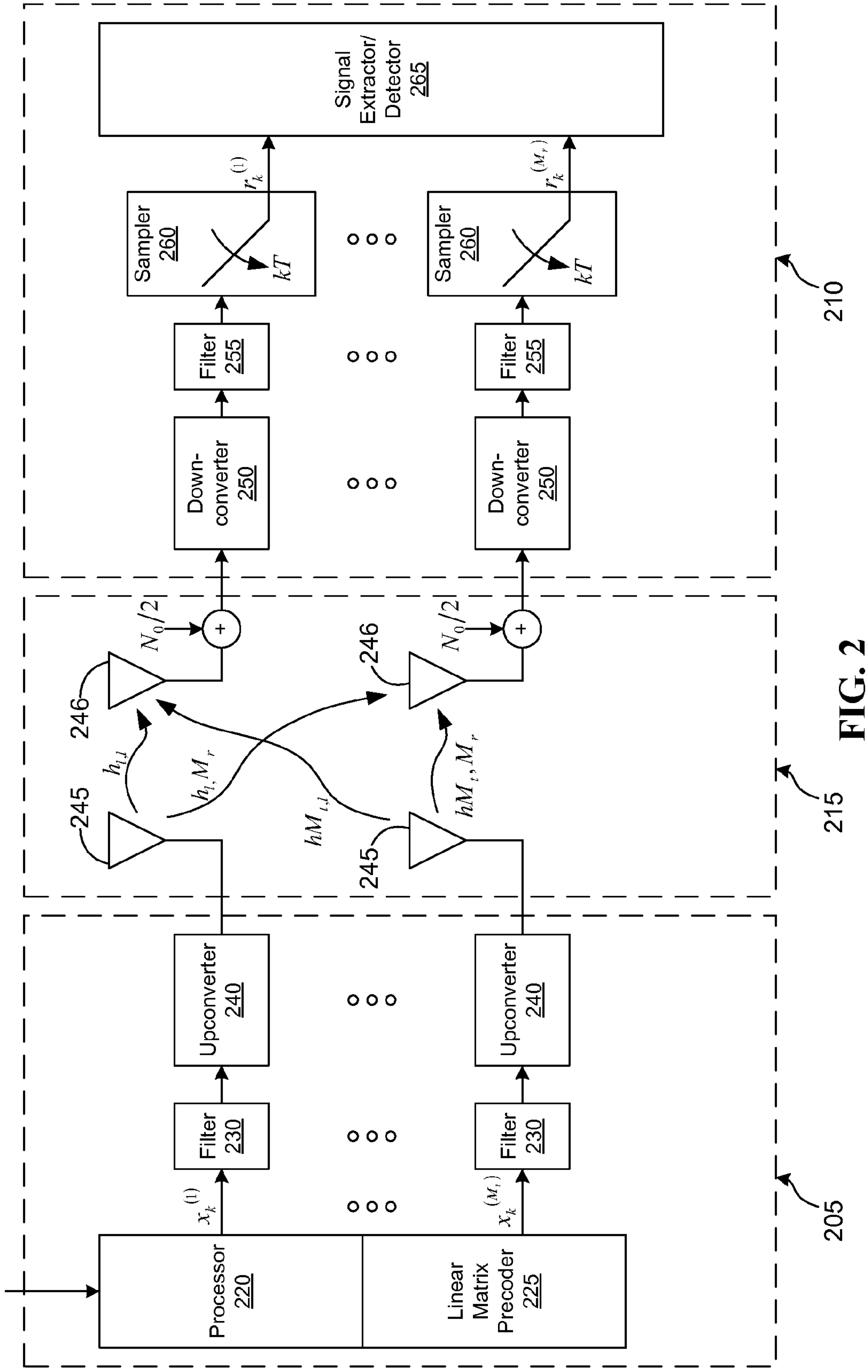
FIG. 2 is a schematic diagram of a multiple-input-multiple-output communications system that implements a uniform channel decomposition, according to another embodiment of the invention.

FIG. 2 schematically illustrates an array-to-array communications system 200 which operatively performs the UCD scheme, according to one particular embodiment. As illustrated, the system 200 comprises a transmitting unit 205 connected to a plurality of transmitting antennas 245 and a receiving unit 210 connected to a plurality of receiving antennas 246 for transmitting and receiving, respectively, encoded signals over a transmission medium or MIMO channel 215. The transmitting unit 205 illustratively includes a processor 220 that performs the matrix operations described previously using a linear matrix precoder 225. The processor 220 can be implemented in dedicated hardwired circuitry or in machine readable code configured to run on an application-specific or general-purpose computing device. Alternatively, the processing unit can be implemented in a combination of hardwired circuitry and machine-readable code. More particularly, the hardwired circuitry can, for example, comprise input/output (I/O) interfaces, one or more microprocessors and/or digital signal processors (DSPs), and memory elements. The machine-readable code can comprise, for example, programming logic to provide signal processing functions such as sampling, encoding, and other processing functions known to those of ordinary skill in the art.

An input signal, S(t), is provided as an input to the processing unit 220. Although illustrated as the initial interface for an input signal, S(t), some of the functions, hardwired circuitry, and/or machine-readable code embodied in the processor 220 can be located apart from the other illustrated components of the transmitting system 205. Moreover, it will be readily appreciated that the functions performed by the processor 220 can be implemented in discrete components within or external to the transmitting system 205.

The processor 220 samples the received input signal, S(t), and maps the sampled bit sequences into a sequence of symbols, $x_k^{(i)}$, i=1, 2, . . . , $M_t$. The $M_t$ symbol sequences drive identical, or substantially identical, pulse-shape filters g(t), such as filter 230. The resultant shaped signals are then upconverted by upconverters 240, to an RF carrier frequency, $f_0$, and transmitted across the transmission medium 215 using a plurality of transmitting antennas 245.

In one implementation, transmission medium 215 comprises a quasi-static fading channel, which as previously described can be mathematically represented by the channel matrix, H. With the transmitted signals represented by row vectors, H, is described by an $M_t\times M_r$ matrix, where $M_t$ is the number of transmit antennas, and $M_r$ is the number of receive antennas. Thus, reference to a channel is, again, to be understood to mean an $M_t\times M_r$ matrix, H, whose elements are channel coefficients as described above. Note that interference in the transmission medium 215, such as co-channel interference, is represented by the diagonal arrows from transmitting system 205 to the receiving system 210.

At the receiving unit 210, $M_r$ passband observations are downconverted by downconverters 250, filtered by a filter 255 and sampled at a predetermined symbol rate by samplers 260 to produce $M_r$ received sequences $r_k^{(i)}$, i=1, 2, . . . , $M_r$. Note that filtering, downconverting, and sampling can be performed in discrete components or in integrated components at the receiving unit 210 or at one or more components located external to the receiving unit. Moreover, the functions can be implemented in hardwired circuitry, machine-readable code, or a combination of circuitry and code.

The sampled signals are illustratively supplied to signal extractor or detector 265. The signal extractor or detector 265, is preferably embodied as a decision feedback equalizer, such as one based on the minimum mean-squared-error vertical Bell Labs layered space-time (MMSE-VBLAST) architecture familiar to those of ordinary skill in the art. The VBLAST detector cancels out known interference prior to signal detection. A particular embodiment of the communication 200 in which the decision feedback equalizer is implemented with a VBLAST detector is referred to herein as a UCD-VBLAST system.

Combining the UCD scheme implemented by the precoder 225 of the processor 220 with a detector such as the MMSE-VBLAST yields particular advantages. Beyond decomposing the transmission channel into multiple subchannels having identical, or nearly identical, channel capacities, the combination mitigates or eliminates the need for bit allocation. The combination also mitigates or eliminates the inherent zero-forcing aspect that typically accompanies the use of a conventional zero-forcing VBLAST architecture or zero forcing algorithm and that can cause significant capacity loss, particularly for signals characterized by low SNRs.

To this point, it has been assumed that both the CSIR and CSIT are known. The assumption regarding the CSIR is reasonable given that it can be easily obtained by the sending of training symbols. In a system based on frequency division duplexing (FDD), the CSIT can be obtained through feedback from the receiver. Conventional FDD systems, however, are subject to errors if the feedback is not frequently updated. With the present invention, however, there is no need to assume a known CSIT. Instead, the CSIT, $\hat{H}$, need not be precise, even though the channel matrix, H, characterizing the transmission medium 215 is known at the receiving system 210. The receiving system 210 can be assumed to the CSIT, $\hat{H}$, since it is the feedback, albeit delayed, of the CSIR.

Under the latter assumption, the above-described UCD-VBLAST, according to still another embodiment of the invention, can be made robust against error in the CSIT. The particular embodiment is referred to herein as a robust UCD-VBLAST scheme. In accordance with this embodiment, the precoder 225 of the processor 220 at the transmitting system 205 calculates the precoder, $\tilde{F}$, as previously described, but here the precoder 225 performs the calculation based on the CSIT, $\hat{H}$. The resulting equivalent channel yields $$y = H\tilde{F}x + z \triangleq Gx + z. \tag{27}$$

Instead of the precoder 225 calculating the nulling vectors according to equation 18, however, the receiving system 210 includes a processor (not shown) that calculates a virtual channel $G=H\tilde{F}$. The processor of the receiving system 210 can apply the algorithm of an optimally ordered MMSE-VBLAST detector. Since the receiving unit 210 has perfect knowledge of the matrix G, the robust UCD-VBLAST scheme performs at least as well as an open-loop MMSE-VBLAST scheme even if the CSIT is not perfectly accurate. Accordingly, the robust MMSE-VBLAST scheme is particularly robust against CSIT errors.

A dual form of the UCD scheme is obtained by reversing the roles of the transmitter and receiver. The received signal is then represented as $$y=H^*x+z, \tag{28}$$

where H* is the conjugate transpose of the previously described channel matrix, x is the transmitted signal symbol, and z denotes the channel noise assumed to have a particular distribution (e.g., additive white Gaussian noise). The reversal yields a precoder $F_{rev}$ and, with respect to cancellation, an equalizer $\{w_i\}_{i=1}^L$. Normalizing the $\{w_i\}_{i=1}^L$ to correspond to the unit Euclidean norm yields $\{\bar{w}_i\}_{i=1}^L$, which forms the vector $W=[\bar{w}_1, \bar{w}_L]$. It follows from the uplink-downlink duality that the precoder is $F=WD_q$, where $D_q$ is a diagonal matrix whose diagonal elements are $\{\sqrt{q_i}\}_{l=1}^L$. $F_{rev}$, the linear precoder in the reverse channel, can be used as a linear equalizer. Therefore, the equivalent MIMO channel is $$y=F_{rev}^*HWD_qx+z, \tag{29}$$

where the i-th scalar subchannel of the MIMO channel is $$y_i = f_i^* H\bar{w}_i\sqrt{q_i}x_i + \sum_{j=i+1}^{L} f_i^* H\bar{w}_j\sqrt{q_j}\,x_j + \sum_{j=1}^{i-1} f_i^* H\bar{w}_j\sqrt{q_j}\,x_j + f_i z. \tag{30}$$

By applying a dirty, paper (DP) precoder to $x_i$ and treating $$\sum_{j=1}^{i-1} f_i^* H\bar{w}_j\sqrt{q_j}\,x_j$$

as the interference known at the transmitter, the following equivalent subchannel is obtained $$y_i = f_i^* H\bar{w}_i\sqrt{q_i}x_i + \sum_{j=i+1}^{L} f_i^* H\bar{w}_j\sqrt{q_j}x_j + f_i^* z \tag{31}$$

having the following SNIR $$\rho_i = \frac{q_i|f_i^* H\bar{w}_i|^2}{\alpha\|f_i\|^2 + \sum_{j=i+1}^{L} q_j|f_i^* H\bar{w}_j|^2}, \text{ for } i = 1, 2, \ldots, L.$$

The next step is to calculate $\{q_i\}_{i=1}^L$ such that $\rho_i=\bar{\rho}$, $1 \leqq i \leqq L$. In matrix form, with $\alpha_{ij}=|f_i^*H\bar{w}_j|^2$, the SNIR representation is $$\begin{bmatrix} a_{11} & -\bar{\rho}a_{12} & \ldots & -\bar{\rho}a_{1L} \\ 0 & a_{22} & \ldots & -\bar{\rho}a_{2L} \\ \vdots & \ddots & \ddots & \vdots \\ 0 & \ldots & 0 & a_{LL} \end{bmatrix} \begin{bmatrix} q_1 \\ q_2 \\ \vdots \\ q_L \end{bmatrix} = \bar{\rho}\alpha \begin{bmatrix} \|f_1\|^2 \\ \|f_2\|^2 \\ \vdots \\ \|f_L\|^2 \end{bmatrix}. \tag{32}$$

It can easily be shown that $q_i>0$, for $0 \leqq i \leqq L$. Moreover, it can be proven that $$\sum_{i=1}^{L} q_i = tr(FF^*) = tr(F_{rev}F_{rev}^*).$$

Figure 3:
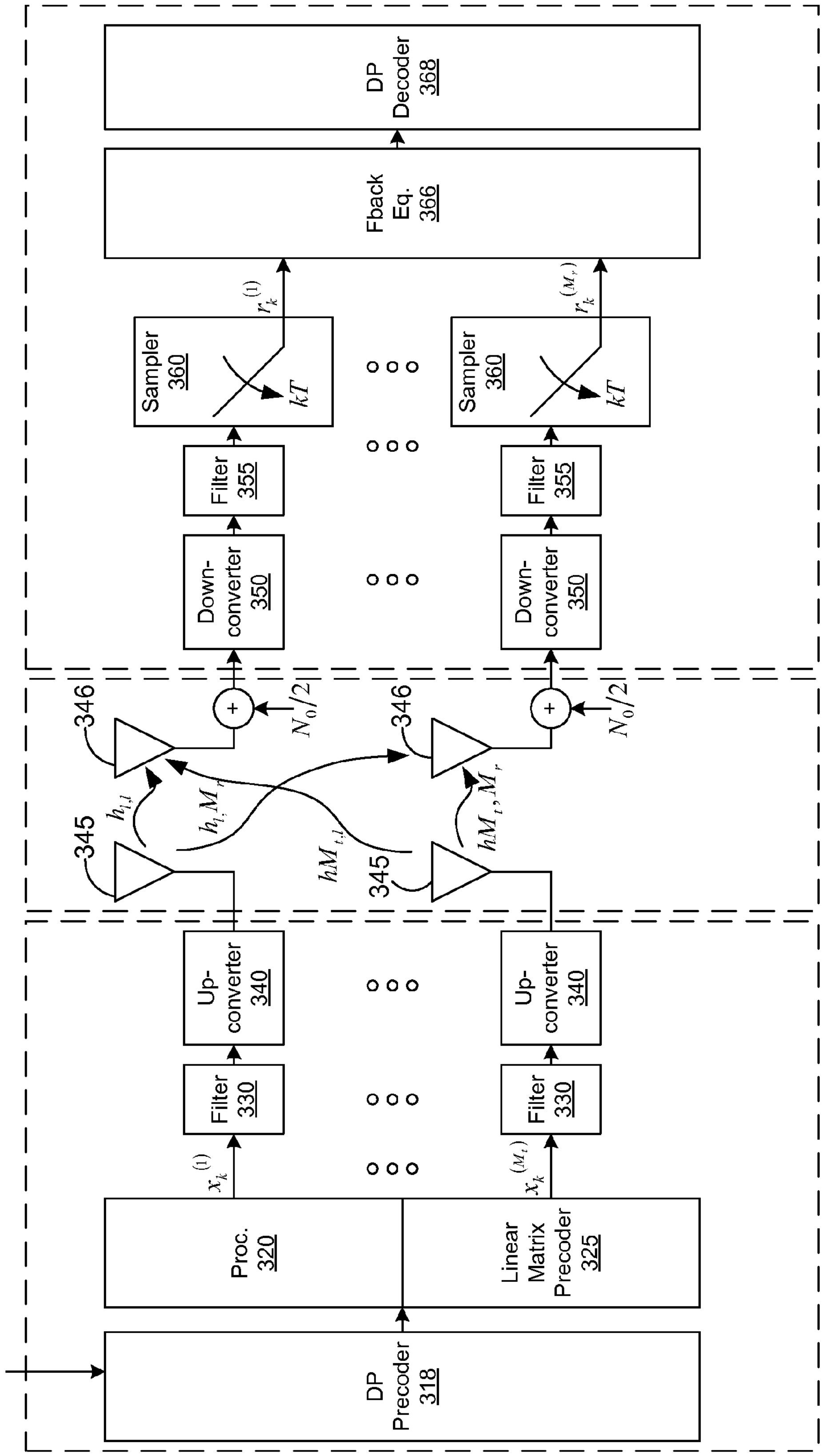
FIG. 3 is a schematic diagram of a multiple-input-multiple-output communications system that implements a dual form of the uniform channel decomposition, according to still another embodiment of the invention.

FIG. 3 schematically illustrates a communications system 300 that, according to still another embodiment of the invention, implements the above-described dual form of the UCD scheme. The system 300 illustratively includes a transmitting unit 305 and a receiving unit 310. The transmitting unit 305 illustratively includes a plurality of filters 330, a plurality of upconverters 340 in communication with the filters, and a plurality of transmitting antennas 345 in communication with the upconverters.

The transmitting unit 305 further includes a DP precoder 318, such as the familiar Tomlinson-Harashima precoder, which precodes a signal input S(t) to suppress known interference prior to transmitting the signal. The transmitting unit 305 further includes a processor 320 for processing the signal and a linear matrix precoder 325 that additionally precodes the signal in accordance with the dual form of the UCD scheme described above. The resulting vector or sequence of symbols, $x_k$, are subsequently filtered by the filters 330 and upconverted in the upconverters 340 prior to their transmission using the plurality of antennas 345.

The transmitted symbols are received by the receiving unit 310. The receiving unit 310 illustratively includes a plurality of receiving antennas 346, a plurality of downconverters 350 in communication with the receiving antennas, a plurality of filters 355 in communication with the downconverters, and a plurality of samplers 360 in communication with the downconverters. The receiving unit 310 further illustratively includes a linear equalizer 366 in communication with the plurality of samplers and a DP decoder 368 in communication with the samplers.

Operatively, the encoded signals transmitted over a channel 315 are received at the receiving unit 310 using the plurality of receiving antennas 350. The received symbols are then downconverted in the downconverters 350, filtered by the filters 355, and sampled by the samplers 360. The sampled signals are detected in the feedback equalizer 366 and the relevant information extracted in the DP decoder 368 in order to effect completion of the dual form UCD scheme.

Yet another embodiment of the invention is a closed-loop design of WLAN based on a MIMO communications system utilizing orthogonal frequency division multiplexing, the system being defined herein as a MIMO-OFDM system. A MIMO-OFDM-based WLAN, according to the invention, combines uniform channel decomposition, as already described, with horizontal encoding and successive, non-iterative decoding.

Figure 4:
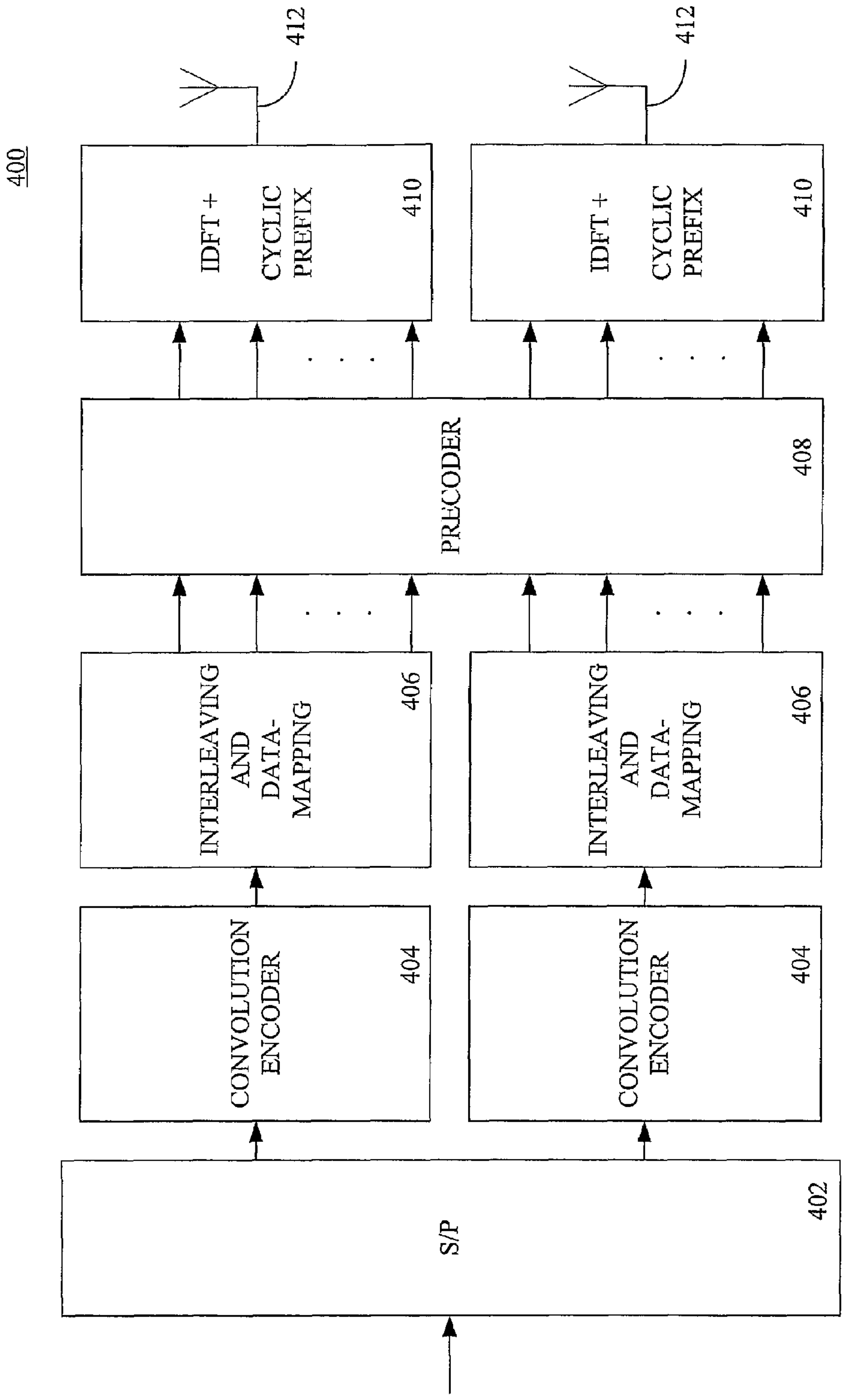
FIG. 4 is a schematic diagram of a MIMO-OFDM transmitter, according to yet another embodiment of the invention.

The MIMO-OFDM-based WLAN incorporates both a MIMO-OFDM transmitter and a MIMO-OFDM-based WLAN. One embodiment of the MIMO-OFDM transmitter 400 is schematically illustrated in FIG. 4. The MIMO-OFDM transmitter 400 illustratively includes a signal processor 402 for generating signal output in response to information data received from an external information source. Signal output form the signal processor 402 is supplied to a pair of convolution encoders 404. The respective outputs of the convolution encoders 404 are supplied to a pair of combined interleaving and data-mapping processing units 406, the outputs of which are fed to a precoder 408. Two sets of parallel signal outputs from the precoder 408 are supplied to a pair of combined inverse discrete Fourier transform (IDFT) and cylic prefix processing units 410. The resulting output of each IDFT and cylic prefix processing unit 410 is transmitted by one of a pair of transmitting antennas 412.

The MIMO-OFDM transmitter 400 implements horizontal encoding, according to which the respective pairs of convolution encoders 404 and interleaving and data-mapping processing units 406 form two parallel branches for separately performing encoding, bit interleaving, and data mapping. The i-th encoded data symbol, i=1, 2, on the k-th subcarrier is $x_{ik}$. The vector of transmitted data symbols, accordingly, is $x_k=[x_{ik},x_{2k}]^T$, where $(\bullet)^T$ again denotes the transpose of the vector. A 2×2 precoder matrix $P_k$ is applied at the precoder 408 with respect to each of N data subcarriers to obtain $\tilde{x}_k=P_kx_k$, $1\leqq k\leqq N$. The $\{P_k\}_{k=1}^N$ are calculated and quantized at a MIMO-OFDM receiver, as described below, and then fed back from the receiver to the transmitter 400. The data symbol of the i-th branch on the k-th subcarrier is $\tilde{x}_{ik}$, which is the i-th element of the vector $\tilde{x}_k$. Each precoded branch is then OFDM modulated by a corresponding one of the pair of IDFT and cylic prefix processing units 410, each of which performs an $N_c$-point IFFT and adds a cyclic prefix (CP) to the corresponding signal prior to its transmission.

Figure 5:
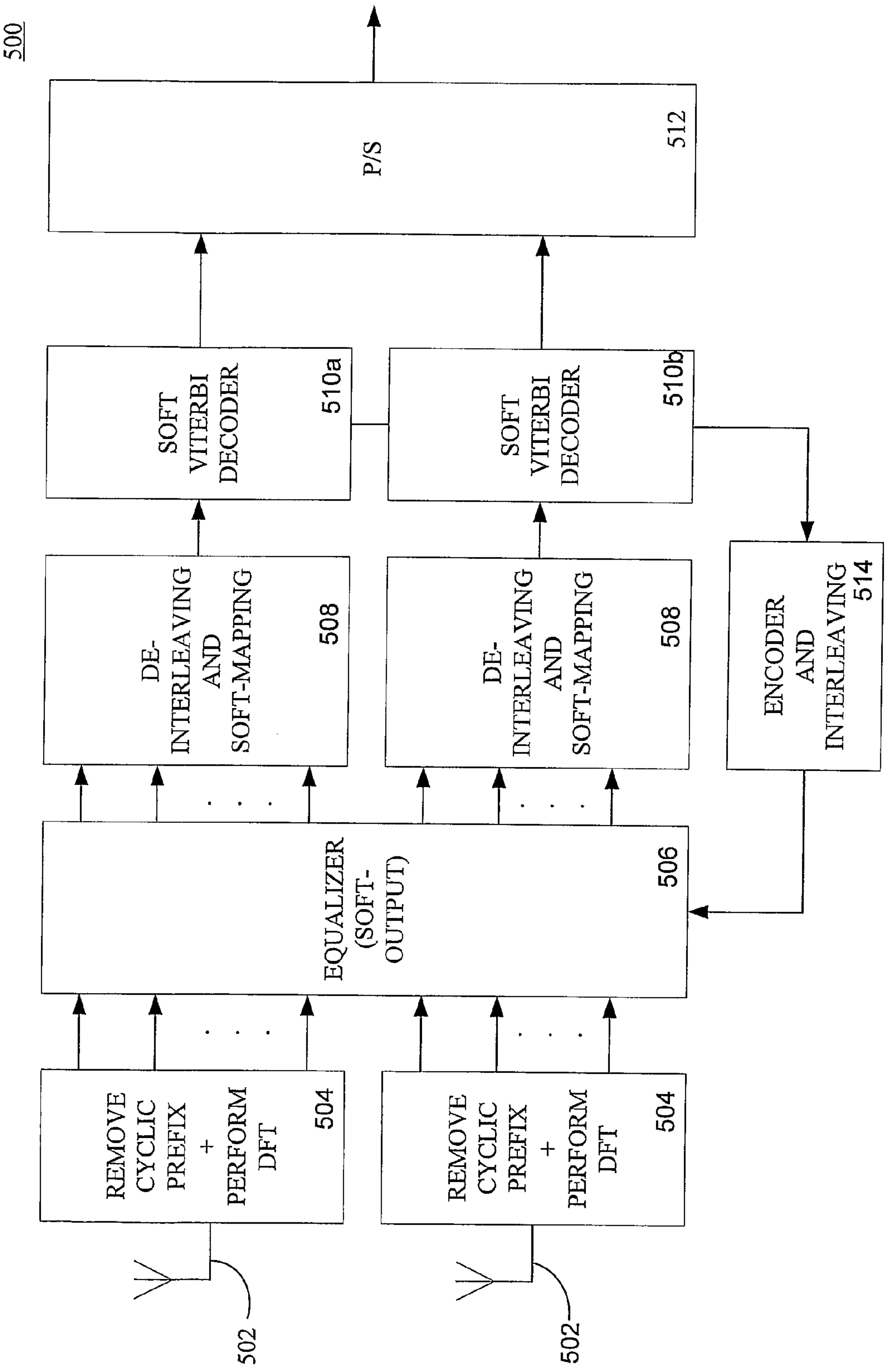
FIG. 5 is a schematic diagram of a MIMO-OFDM receiver, according to still another embodiment of the invention.

Referring additionally now to FIG. 5, one embodiment of a corresponding MIMO-OFDM receiver 500 is schematically illustrated. The MIMO-OFDM 500 illustratively includes a pair of antennas 502 which receive signals from the MIMO-OFDM transmitter 400. The received signals are fed, again as parallel branches, to a pair of processing units 504 that first remove the CP and apply an $N_c$-point FFT to each branch, respectively. Preferably, the conditions are such that perfect, or near-perfect, synchronization, frequency offset estimation, and channel estimation can be assumed.

The received signal vector on the k-th data subcarrier is therefore $$y_kH_kP_kx_k+z_k,\ k=1, 2, \ldots, N, \tag{33}$$

where the noise component is $z_k\sim N(0, \sigma_z^2 I)$; the noise component is assumed to be circularly symmetric Gaussian noise. The received branches are then supplied to an equalizer 506, described more particularly below. The respective branches are subsequently fed from the equalizer 506 to a second pair of processing units 508, which each perform de-interleaving and soft de-mapping on a respective branch. Each branch is then fed to a corresponding (soft) Viterbi decoder, denoted herein as an upper and lower branch Viterbi decoder 510*a* and 510*b*, respectively. The respective outputs of the upper and lower branch Viterbi decoders 510*a* and 510*b* are subsequently supplied to another processor 512 for recovering the original information transmitted from the transmitter. The lower branch Viterbi decoder 510*b* also provides a feedback to the equalizer 506 via connection 514.

Precoder and Equalizer Design

A key component of the closed-loop design is the precoder matrix $P_k$ applied by the precoder 408 at the transmitter 400 and the operations performed by the equalizer 506 at the receiver 500. The precoder matrix $P_k$ can be determined as described above. A geometric mean decomposition (GMD) of the channel matrix $H_k$ at the receiver 500 yields $$H_k=Q_kR_kP_k^*, \tag{34}$$

from which the precoder matrix $P_k$ is determined. The precoder matrix is fed back to the transmitter 400. Note that $P_kP_k^*=I$. Applying the precoder matrix $P_k$ at the transmitter 400 results in the transmission of a symbol-encoded signal that when received at the receiver 500 has the following data vector form:

$$y_k=Q_kR_kx_k+z_k,\ k=1, 2, \ldots, N. \tag{35}$$

At the receiver, the data vector, $y_k$, is multiplied by $Q_k^*$, yielding $$\tilde{y}_kR_kx_k+\tilde{z}_k,$$

where $R_k=Q_k^*H_kP_k$ is a 2×2 upper triangular matrix with constant diagonal elements and $z_k\sim N(0,\sigma_z^2 I)$. The information symbols $x_k$ can then be successively detected starting with the last element of the vector.

Successive Soft Decoding

The matrix $R_k$ is an upper triangular matrix. As already noted, the receiver 500 performs de-interleaving and soft de-mapping. A low-complexity soft Viterbi decoder can be used for each branch separately. The data sequence of the lower branch is detected initially to get the soft information. After the data of the lower branch is decoded, the interference due to the lower branch is subtracted from the upper branch prior to the latter being decoded. Interference cancellation based on a GMD can be accomplished in two stages: an initial stage and a cancellation stage.

At the initial stage, the following are obtained:

$$\sigma_{2k}^2 = E[|\tilde{z}_{2k}/(R_k)_{22}|^2] = \sigma_z^2/(R_k)_{22}^2, \text{ and} \tag{36a}$$

$$\hat{x}_{2k}\hat{x}_{2k} = \tilde{y}_{2k}/(R_k)_{22}, k = 1, \dots, N. \tag{36b}$$

Note that the $\sigma_{2k}^2$ and $\hat{x}_{2k}$ values provide the soft information of the lower branch. The lower branch data sequence can be decoded using the soft Viterbi decoder.

At the cancellation stage, the following are obtained:

$$\sigma_{1k}^2 = E[|\tilde{z}_{1k}/(R_k)11|^2] = \sigma_z^2/(R_k)_{11}^2, \text{ and} \tag{37a}$$

$$\hat{x}_{1k} = [\tilde{y}_{1k} - (R_k)_{12}\overline{x}_{2k}]/(R_k)_{11}, l = 1, \dots, N, \tag{37b}$$

where the $\sigma_{1k}^2$ and $\hat{x}_{1k}$ values provide the soft information for the upper branch; $\overline{x}_{2k}$ denotes the re-encoded lower branch data symbol sequence obtained via feedback from the lower branch Viterbi decoder. Given the soft information for the upper branch, the upper branch data sequence can be decoded using the soft Viterbi decoder. Uniform channel decomposition (UCD) ensures that the diagonal elements of the $R_k$ are identical. Accordingly, in each of the two branches, $\sigma_{1k}^2=\sigma_{2k}^2$. This provides an advantage over conventional techniques, such as the V-BLAST, with which the two branches typically exhibit unbalanced gains and in which the weaker branch dominates the overall BER.

Precoder Quantization

The overhead of feeding back the precoders, $P_k$, k=1, . . . , N, to the transmitter can be reduced by quantizing the precoder matrix $P_k$. Note that a 2×2 semi-unitary precoder matrix $P_k$ can be $$P(\theta, \phi) = \begin{bmatrix} \cos\theta & -\sin\theta e^{-j\phi} \\ \sin\theta e^{j\phi} & \cos\theta \end{bmatrix}, 0 \le \theta < \pi, 0 \le \phi \le 2\pi. \tag{40}$$

The two methods can be utilized for quantization: scalar quantization and vector quantization.

Scalar Quantization

A precoder according to the scalar quantization scheme presented here can be represented as $$P(\theta_{n1}, \phi_{n2}) = \begin{bmatrix} \cos\theta_{n1} & -\sin\theta_{n1} e^{-j\phi_{n2}} \\ \sin\theta_{n1} e^{j\phi_{n2}} & \cos\theta_{n1} \end{bmatrix}, \tag{41}$$

where $$\theta_{n1} = \frac{\pi n_1}{N_1},$$

$0 \leqq n_1 \leqq N_1-1$, and $$\phi_{n2} = \frac{2\pi n_2}{N_2},$$

$0 \leqq n_2 \leqq N_2 31\ 1$; $N_1$ and $N_2$ denote the quantization levels of $\theta_{n1}$ and $\phi_{n2}$, respectively. After obtaining the precoder matrix $P_k$ using the UCD scheme, the precoder $P_k$ can be quantized to the "closest" grid point. Thus only the index $(n_1,n_2)$ needs to be fed back to the transmitter. The total bit number required, therefore, is $\log_2(n_1,n_2)$. To reduce the effect of quantization error, $\tilde{Q}_k^*$ is used in lieu of applying the original equalizer $\tilde{Q}_k^*$ at the receiver. $\tilde{Q}_k^*$ is obtained via a QR decomposition:

$$H_k P(\theta_{n1},\phi_{n2}) \triangleq \tilde{Q}_k \tilde{R}_k, k=1, \dots, N. \tag{42}$$

Vector Quantization

Vector quantization can be adopted to further reduce the overhead associated with feeding the precoders the precoders, $P_k$, k=1, . . . , N, back to the MIMO transmitter 400. The following is a geometric approach for performing the vector quantization. Vector quantization can be used to quantize the precoder $P(\theta,\phi)$ to $P(\hat{\theta}, \hat{\phi})$. Instead of transmitting the desired data vector $P(\theta,\phi)x_k$ at the transmitter, $x_k$ being an encoded data vector, $P(\tilde{\theta},\tilde{\phi})x_k$ is instead transmitted. The following cost function is minimized in order to optimize the quantization scheme:

$$d=\|P(\theta,\phi)x_k-P(\hat{\theta},\hat{\phi})x_k\|^2=x_k^*[P(\theta,\phi)-P(\hat{\theta},\hat{\phi})]^*[P(\theta,\phi)-P(\hat{\theta},\hat{\phi})]x_k, \tag{43}$$

where $\|\bullet\|$ is the Euclidean norm. Moreover, by straightforward algebraic manipulation $$[P(\theta,\phi)-P(\hat{\theta},\hat{\phi})]^*[P(\theta,\phi)-P(\hat{\theta},\hat{\phi})]=2I_2-2[\cos\theta\cos\hat{\theta}+\sin\theta\sin\hat{\theta}\cos(\phi-\hat{\phi})]I_2, \tag{44}$$

where $I_2$ is the identity matrix of dimension 2. Because the value of $\|x_k\|$ does not affect the quantization, $\|x_k\|$ can be taken to be one without loss of generality. Accordingly, $$2-2\left[\cos\theta\cos\hat{\theta}+\sin\theta\sin\hat{\theta}\cos(\phi-\hat{\phi})\right] \triangleq 2-2\varsigma. \tag{45}$$

Note that there is a one-to-one and onto mapping from the unitary precoder set $\{P(\theta,\phi)|0\leqq\theta<\pi, 0\leqq\phi<2\pi\}$ to the surface of a three dimensional sphere $\{v\in\mathbb{R}^3 | \|v\|=1\}$. Any point on the surface of a three dimensional unit sphere with angles $(\theta,\phi)$) can be represented in the Cartesian coordinate as $v=[\cos\theta, \sin\theta\cos\phi, \sin\theta\sin\phi]^T$, where the first element of v is the (1,1)-element of $P(\theta,\phi)$ and the second and third elements of v, respectively, are the real and imaginary parts of the (1,2)-th element of $P(\theta,\phi)$. Each $P(\theta,\phi)$ corresponds to a point v on the surface of the three dimensional unit sphere. Similarly, any point on the surface of the unit sphere with angles $(\hat{\theta}, \hat{\phi})$ can be represented by the Cartesian coordinate $\hat{v}=[\cos\hat{\theta}, \sin\hat{\theta}\cos\hat{\phi}, \sin\hat{\theta}\sin\hat{\phi})]^T$. Accordingly, a geometric interpretation of $\zeta$ is that it is just the inner product between v and $\hat{v}$. If $\psi$ is the angle between v and $\hat{v}$, then $\zeta=\cos\psi$ and $$d=(2-2\cos\psi)=\|v-\hat{v}\|^2. \tag{46}$$

The quantized vector $\hat{v}$ of v can be obtained from a predefined codebook $\{\overline{v}\}_{i=1}^{Nv}$, which is know at both the transmitter and the receiver. The following steps can be used to determine the codebook. First, a training set $\{v_n, n=1, 2, \dots, N_t\}$ can be generated by randomly picking $N_t$ points on the surface of a three dimensional unit sphere, where $N_t$ is a large number. Then, starting with an initial codebook obtained, for example, via the known splitting technique, the codebook is iteratively updated until no further improvement in the minimum distance is observed according to the following criteria:

1. The nearest neighbor condition (NNC). For a given codebook $\{\overline{v}_t\}_{i=1}^{Nv}$, assign $v_n$ to the i-th region:

$$S_i = \{v_n : \|v_n - \overline{v}_i\|^2 \le \|v_n - \overline{v}_j\|^2, \forall j \ne i\},$$

where $S_i$, i=1, 2, . . . , $N_v$, is the partition set for the i-th code vector; and 2. The centroid condition (CC). For a given partition, $S_i$, the optimum code vectors $\{\bar{v}_i\}_{i=1}^{Nv}$ satisfy $$\tilde{v}_i = \arg\min_{\|\bar{v}_i\|=1} E\left[\|v_n - \tilde{v}_i\|^2 \mid v_n \in S_i\right],\ i = 1, 2, \ldots, N_v.$$

It can be shown that the solution to the above optimization problem is $$\tilde{v}_i = \frac{\bar{v}_i}{\|\bar{v}_i\|},\ i = 1, 2, \ldots, N_v,$$

where $$\bar{v}_i = \frac{\sum_{v_n \in S_i} v_n}{\sum_{v_n \in S_i} 1}$$

is the mean vector for the partition set $S_i$, i=1, 2, . . . , $N_v$.

Accordingly, for each k-th subcarrier, the precoder $P_k$ is first mapped as a random point v on the surface of the a three dimensional unit sphere. According to NNC, the quantized vector $\bar{v}$ is obtained from the codebook with index i. The index i is fed back to the transmitter to reconstruct the precoder $P(\hat{\theta}, \hat{\phi})$. The total bit number required is $\log_2(N_v)$. As in scalar quantization, to reduce the effect of quantization err, the QR decomposition and MMSE V-BLAST algorithm can be applied to $H_k P(\hat{\theta}, \hat{\phi})$ when using GMD and UCD.

Geometric Mean Decomposition Algorithm

As already noted, the UCD scheme implemented by the system and procedures described herein incorporates a procedure referred to as a geometric mean decomposition. An algorithm for evaluating the geometric mean decomposition (GMD) starts with the singular value decomposition $H=U\Lambda V^*$. The algorithm generates a sequence of upper triangular matrices, $R^{(K)}$, $1 \leqq \tilde{K} \leqq K$, with $R^{(1)}=\Lambda$. Each matrix $R^{(K)}$ has the following properties:

(a) $r_{ij}^{(K)}=0$, if $i \geqq j$ or $j \geqq \max\{\tilde{K}, i\}$, and (b) $r_{ii}^{(K)}=\bar{\lambda}_H$ for all $i<\tilde{K}$.

The geometric mean of $r_{ii}^{(K)}$, $K \leqq i \leqq K$, is $\bar{\lambda}_H$.

These orthogonal matrices are constructed using a symmetric permutation and a pair of Givens rotations, as known in the art. $R^{(K)}$ is assumed to satisfy properties (a) and (b). If $r_{kk}^{(k)} \geqq \bar{\lambda}_H$, then a permutation matrix $\Pi$ can be chosen having the property that $\Pi R^{(k)}\Pi$ exchanges the (k+1) diagonal element $R^{(k)}$ with any element $r_{pp}$, p>k, for which $r_{pp} \leqq \bar{\lambda}_H$. If $r_{kk}^{(k)} < \bar{\lambda}_H$, then the permutation matrix $\Pi$ is chosen to exchange the (k+1) diagonal element with any element $r_{pp}$, p>k, for which $r_{pp} \geqq \bar{\lambda}_H$. The new diagonal elements at locations k and k+1 associated with the permuted matrix $\Pi R^{(k)}\Pi$ are denoted $\delta_1=r_{kk}^{(k)}$ and $\delta_2=r_{pp}^{(k)}$.

Orthogonal matrices $G_1$ and $G_2$ are subsequently constructed by modifying the elements in the identity matrix that lie at the intersection of rows k and k+1 and columns k and k+1. The permuted matrix $\Pi R^{(k)}\Pi$ is multiplied on the left by $G_2^T$ and on the right by $G_1$. The multiplications change the elements in the 2-by-2 submatrix at the intersection of rows k and k+1 with columns k and k+1. The choice of elements for $G_1$ and $G_2$ according to the procedure, focusing on the relevant 2-by-2 submatrices of $G_2^T$, $\Pi R^{(k)}\Pi$, and $G_1$, are $$\underbrace{\bar{\lambda}_H^{-1}\begin{bmatrix} c\delta_1 & s\delta_2 \\ -s\delta_2 & c\delta_1 \end{bmatrix}}_{G_2^T} \underbrace{\begin{bmatrix} \delta_1 & 0 \\ 0 & \delta_2 \end{bmatrix}}_{\Pi R^{(k)}\Pi} \underbrace{\begin{bmatrix} c & -s \\ s & c \end{bmatrix}}_{G_1} = \underbrace{\begin{bmatrix} \bar{\lambda}_H & x \\ 0 & y \end{bmatrix}}_{(R^{(k+1)})} \tag{47}$$

If $\delta_1=\delta_2=\bar{\lambda}_H$, then c is taken to be one and s is taken to be zero; if $\delta_1 \neq \delta_2$, then c and s, respectively, are taken to be $$c = \sqrt{\frac{\bar{\lambda}_H^2 - \delta_2^2}{\delta_1^2 - \delta_2^2}} \text{ and } s = \sqrt{\frac{\delta_1^2 - \bar{\lambda}_H^2}{\delta_1^2 - \delta_2^2}}. \tag{48}$$

Note that since $\bar{\lambda}_H$ lies between $\delta_1$ and $\delta_2$, c and s are nonnegative real-valued scalars.

Figure 6:
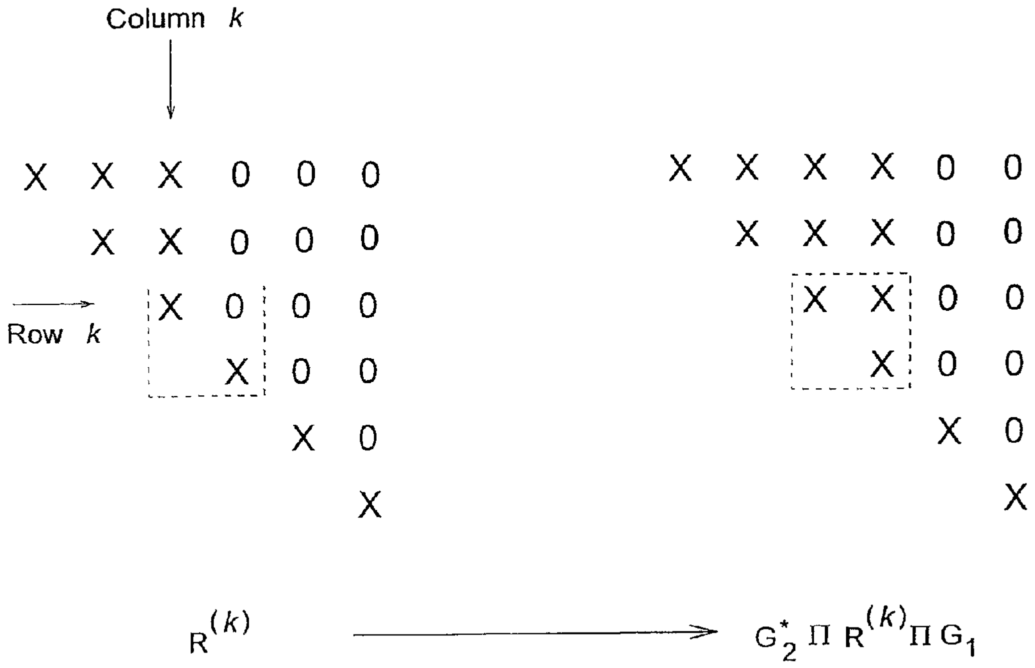
FIG. 6 is a schematic diagram of a matrix transformation based on a geometric mean decomposition according to one aspect of the invention.

FIG. 6 schematically illustrates a transformation from $R^{(k)}$ to $G_2^T \Pi R^{(k)}\Pi G_1$. The dashed box is the 2-by-2 submatrix on the right-hand side of equation 47. Note that c and s, defined as in 48, are real-valued scalars chosen such that $$c^2+s^2=1 \text{ and } (c\delta_1)^2+(s\delta_2)^2=\bar{\lambda}_H^2.$$

The validity of equation 47 follows by direct computation with the above identities. Defining $Q_k=\Pi G_2$ and $P_k=\Pi G_1$, the matrix $R^{(k+1)}$ is set equal to $Q_k^T R^{(k)} P_k$:

$$R^{(k+1)}=Q_k^T R^{(k)} P_k. \tag{49}$$

It follows from FIG. 6, equation 47, and the identity $|R^{(k+1)}|=|R^{(k)}|$ that both conditions (a) and (b), above, hold for $\tilde{K}$=k+1. There thus exists a real-valued upper triangular matrix $R^{(k)}$, with $\overline{p\lambda}_H$ on the diagonal of the matrix, and unitary matrices $Q_i$ and $P_i$, i=1, 2, . . . , K−1, such that $$R^{(K)}=(Q_{K-1}^T \ldots Q_2^T Q_1^T)\Sigma(P_1 P_2 \ldots P_1). \tag{50}$$

H=QRP* is obtained by combining the identity 50 with the singular value decomposition, where $$Q = U\left(\prod_{i=1}^{K-1} Q_i\right),\ R = R^{(K)},\ \text{and}\ P = V\left(\prod_{i=1}^{K-1} P_i\right).$$

Given the SVD, this algorithm for the GMD requires $O((M_r+M_t)K)$ flops. By contrast, the reduction of H to bi-diagonal form using the known Golub-Reinsch bi-diagonalization scheme, often the initial step in obtaining the SVD, requires $O(M_r M_t K)$ flops.

The invention as already noted can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, moreover, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. A multi-input multi-output (MIMO) communications system for conveying signals over a MIMO channel, the system comprising:

a precoder for precoding a signal based upon a uniform channel decomposition scheme using a precoder matrix, the precoder being configured to generate the precoder matrix by multiplying a first matrix, a second matrix, and a third matrix, the first matrix determined at least in part from a singular value decomposition of a channel matrix corresponding to the MIMO channel, the second matrix having a plurality of diagonal terms, each diagonal term corresponding to a power allocation to a respective one of a plurality of subchannels of the MIMO channel, the third matrix determined at least in part from a geometric mean decomposition of a diagonal matrix; and a transmitter in communication with the precoder for conveying the precoded signal over a subchannel of the MIMO channel.

2. The system of claim 1, wherein the uniform channel decomposition scheme decomposes the MIMO channel into a plurality of subchannels having identical capacities.

3. The system of claim 1, wherein the precoder comprises a linear precoder.

4. The system of claim 3, further comprising a receiver for receiving the precoded signal, and further comprising a detector in communication with the receiver for extracting information content from the received precoded signal.

5. The system of claim 4, wherein the detector comprises a decision feedback equalizer for canceling known interference in the precoded signal after the precoded signal is received by the receiver.

6. The system of claim 5, wherein the decision feedback equalizer is a vertical Bell Labs layered space time (VBLAST) detector.

7. The system of claim 6, wherein the VBLAST detector is a minimum mean-squared-error (MMSE) VBLAST detector.

8. The system of claim 1, wherein the precoder comprises a dirty paper (DP) precoder.

9. The system of claim 8, further comprising a receiver, a liner equalizer in communication with the receiver, and a DP decoder in communication with the linear equalizer.

10. The system of claim 1, wherein the transmitter comprises a MIMO-orthogonal frequency division multiplexing (OFDM) transmitter.

11. The system of claim 10, further comprising a receiver having a processor for generating a precoder matrix and conveying the precoder matrix to the processor in communication with the transmitter.

12. The system of claim 1, wherein the transmitter comprises at least one of a cellular phone, a personal digital assistant (PDA), a digital subscriber line (DSL)-based device, and a computing device in which a processor is embedded.

13. The system of claim 1, wherein the diagonal matrix is determined at least in part from the first matrix and the second matrix.

14. The system of claim 1, wherein the diagonal matrix is determined at least in part from a plurality of singular values calculated for the channel matrix, the power allocations, and a signal-to-noise ratio of the MIMO channel.

15. A method for conveying signals over a multi-input multi-output (MIMO) channel, the method comprising:

generating a precoder matrix by multiplying a first matrix, a second matrix, and a third matrix, the first matrix determined at least in part from a singular value decomposition of a channel matrix corresponding to the MIMO channel, the second matrix having a plurality of diagonal terms, each diagonal term corresponding to a power allocation to a respective one of a plurality of subchannels of the MIMO channel, the third matrix determined at least in part from a geometric mean decomposition of a diagonal matrix;

precoding a signal based upon a uniform channel decomposition scheme using the precoder matrix; and transmitting the precoded signal over a subchannel of the MIMO channel.

16. The method of claim 15, wherein the signal comprises a symbol vector.

17. The method of claim 15, further comprising generating a set of nulling vectors for performing sequential nulling and cancellation of known interference on the precoded signal after the signal is received over the MIMO subchannel.

18. A multi-input multi-output (MIMO) communications system, comprising:

a transmitting unit including an array of transmitting antennas and a uniform channel decomposition module for decomposing a MIMO transmission channel into multiple subchannels having equal capacities over which multiple communications signals are conveyed;

wherein the uniform channel decomposition module comprises logic that multiplies a first matrix, a second matrix, and a third matrix, the first matrix determined at least in part from a singular value decomposition of a channel matrix corresponding to the MIMO transmission channel, the second matrix having a plurality of diagonal terms, each diagonal term corresponding to a power allocation to a respective one of a plurality of subchannels of the MIMO channel, the third matrix determined at least in part from a geometric mean decomposition of a diagonal matrix; and a receiving unit including an array of receiving antennas for receiving the multiple communications signals.

19. The communications system of claim 18, wherein the receiving unit further comprises a detector for extracting information content from received multiple communications signals.

* * * * *

UNITED STATES PATENT AND TRADEMARK OFFICE

CERTIFICATE OF CORRECTION

PATENT NO. : 7,711,066 B2
APPLICATION NO. : 11/718506
DATED : May 4, 2010
INVENTOR(S) : Yi Jiang and Jian Li It is certified that error appears in the above-identified patent and that said Letters Patent is hereby corrected as shown below:

Column 1, line 3, insert the following paragraph:

--STATEMENT REGARDING FEDERALLY SPONSORED RESEARCH OR DEVELOPMENT

This invention was made with U.S. Government support under Agreement No. CCR-0104887, awarded by the National Science Foundation. The Government has certain rights in this invention.--

Signed and Sealed this

Twentieth Day of July, 2010

David J. Kappos
*Director of the United States Patent and Trademark Office*